United States Patent [19]

Dion

[11] 4,371,183

[45] Feb. 1, 1983

[54] FOLDING WHEEL-CHAIR

[76] Inventor: Jean-Paul Dion, 327 - 21st St., Quebec, Canada, G1L 1X6

[21] Appl. No.: 218,808

[22] Filed: Dec. 22, 1980

[51] Int. Cl.[3] .............................................. B62B 11/00

[52] U.S. Cl. .............................. 280/42; 280/289 WC; 280/650; 297/DIG. 4; 297/44; 297/357

[58] Field of Search ................. 280/647, 649, 650, 42, 280/289 WC; 180/DIG. 3; 297/44, 42, DIG. 4, 357

[56] References Cited

U.S. PATENT DOCUMENTS

| | | | |
|---|---|---|---|
| 475,013 | 5/1892 | Hanley | 297/42 X |
| 2,665,743 | 1/1954 | Cosper | 155/30 |
| 3,142,351 | 7/1964 | Green | 280/42 X |
| 4,042,250 | 8/1977 | Rodaway | 280/42 |
| 4,045,082 | 8/1977 | Egert et al. | 297/357 |
| 4,229,039 | 10/1980 | Day | 297/DIG. 4 X |

FOREIGN PATENT DOCUMENTS

| | | | |
|---|---|---|---|
| 84803 | 1/1958 | Denmark | 280/42 |
| 664813 | 4/1929 | France | 280/650 |

*Primary Examiner*—Douglas C. Butler
*Assistant Examiner*—Donald W. Underwood

[57] ABSTRACT

This folding wheel-chair is characterized by a rigid seat and a rigid back-rest and that is nevertheless of simple construction and operation. This folding wheel-chair comprises a pair of opposite sides, each including an upper portion upwardly slidable relative to a corresponding lower portion, a pair of braces articulated to each other intermediate their ends and to the lower and upper portions at their opposite ends about fore and aft axes, a pair of offsetting arms pivotally supporting one side of the rigid seat on the upper portion of one side of the wheel-chair, supporting members removably resting on the upper portion of the other side of the wheel-chair, and a rigid back-rest foldable over the rigid seat for bodily pivoting therewith to an upwardly edgewise position between the opposite sides of the wheel-chair upon folding of the latter.

8 Claims, 8 Drawing Figures

FOLDING WHEEL-CHAIR

This invention relates to a folding wheel-chair.

The folding wheel-chairs are now commonly made with a flexible seat and back-rest, such as of canvas, to allow folding of the chair. The flexible seat and back-rest are found uncomfortable to the user, in particular when he has to spend long times in his wheel-chair. Besides, the flexible seat and back-rest do not firmly support the user's body, causing problems associated with bad posture of the body.

There has been proposed a folding wheel-chair with a rigid seat. However, the resulting wheel-chair still embodies a flexible back-rest and uses a relatively complex articulated transverse bracing.

It is a general object of the present invention to provide a folding wheel-chair that avoids the above-mentioned disadvantages.

It is an otherwise stated general object of the present invention to provide a folding wheel-chair that avoids the disadvantages particularly associated to a wheel-chair having a flexible seat, a flexible back-rest, or both.

It is another object of the present invention to provide a folding wheel-chair including a rigid base seat and a rigid back-rest and that is nevertheless of simple construction and operation and which enables the use of orthopedic pads to correct deformations of the user's body.

The above and other objects and advantages of the present invention will be better understood by reference to the following detailed description of a preferred embodiment thereof which is illustrated, by way of example, in the accompanying drawings, in which.

The illustrated folding wheel-chair comprises a pair of opposite sides, each separately carried by the conventional large propelling wheel 1 and small caster wheel 2. The construction of those wheels and their connection to a wheel-chair is well known in the art and does not form part of the present invention.

Figure 5:
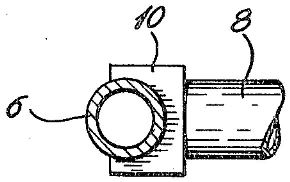
FIGS. 5 and 6 are top and elevation views, respectively, of a sliding joint between an upwardly-sliding upper side portion and a fixed post of the same wheel-chair.
Figure 6:
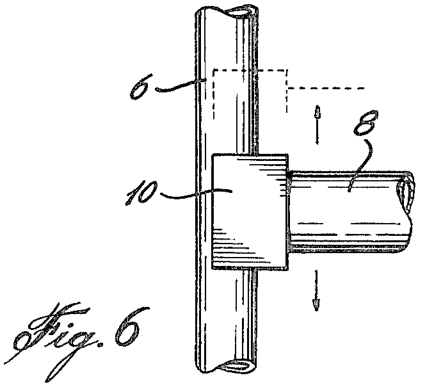

Each of the opposite sides of the wheel-chair comprises a lower portion formed by a tubular frame to which the corresponding wheels 1 and 2 are rotatively secured. This tubular frame includes a pair of fore and aft bars 3 and 4 rigidly secured to a pair of tubular posts 5 and 6. Each of the posts 6 ends into a handle 7. Each of the forward posts 5 is open at the top. Each of the opposite sides of the wheel-chair also includes an upper portion that is slidable up and down relative to the corresponding lower side portion. Each upper side portion includes a fore and aft bar 8 and an upright post 9 rigidly projecting endwise downwardly from the forward end of the corresponding fore and aft bar 8 and slidable endwise up and down inside the corresponding tubular front post 5. A sliding block 10 is fixedly secured to the rear end of each fore and aft bar 8 and is provided with a rear surface portion complementarily curved to guidingly slide up and down against the front of the corresponding rear post 6, as best shown in FIGS. 5 and 6.

An articulated bracing 11 transversely interconnects the opposite sides of the wheel-chair to move the sides transversely toward and away relative to each other. The articulated bracing includes a pair of braces 12 articulated to each other by a pivot pin 13 extending through their intermediate portion and defining a fore and aft pivot axis. The lower end of each brace 12 is hinged to the corresponding fore and aft bar 3, while the upper end of each brace is hinged to the corresponding fore and aft bar 8, all about fore and aft axes. As may be seen from FIGS. 2 and 3, when the braces 12 pivot to unfold the wheel-chair, the upper side portions of the opposite sides of the chair move downward with retraction of the posts 9 into the tubular front posts 5 and with sliding of the sliding blocks 10 against the rear posts 6. When the braces 12 pivot to fold the wheel-chair to bring the opposite sides closer to each other, the posts 9 and the blocks 10 upwardly slide relative to the bottom side portions. This upper portion of each brace 12 is laterally offset outwardly to define a predetermined lateral interspace between the braces.

Figure 1:
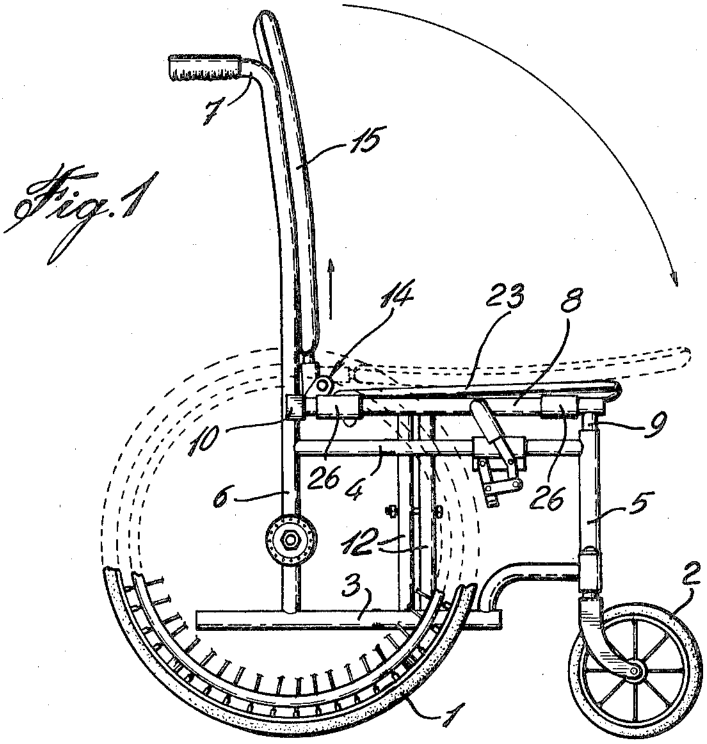
FIG. 1 is a side elevation view of a folding wheel-chair according to the present invention.
Figure 4:
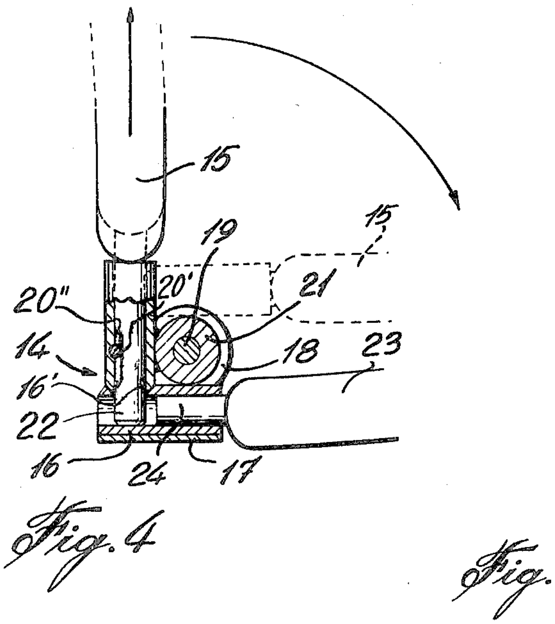
FIG. 4 is a vertical cross-section through a hinge connection between the back-rest and the seat of the wheel-chair of FIGS. 1, 2, and 3.

For each of the opposite sides of the wheel-chair, there is provided a hinge 14, shown in details in FIG. 4, for a back-rest 15. Each hinge 14 includes a sleeve 16 axially aligned in the fore and aft direction and fixedly secured on a bracket 17 having upstanding arms 18 carrying a pivot pin 19 between them. Each hinge 14 also includes a pivotable sleeve 20 that is fixedly secured on a bearing 21 rotatable around the corresponding pivot pin 19. Thus, pivotable sleeve 20 of each hinge 14 is pivotable between an axially upright position, shown in full lines, and an axially fore and aft position, shown in dashed lines in FIG. 4. The back-rest 15 is provided with a pair of downwardly-projecting pins 22 slidable in the two pivotable sleeves 20 defined by the two hinges 14. A cross pin 20', carried by sleeve 20, engages a flat 20" in pin 22 to prevent removal of pin 22 from sleeve 20. The pins 22 have each an outer end adapted to engage into a top hole 16' of the fore and aft sleeve 16 and thus lock the back-rest in upstanding position. A seat 23 has a pair of rearwardly-projecting pins 24 inserted into, and fixed to, the pair of axially fore and aft sleeves 16. Upon pulling upwardly on back rest 15, pins 22 clear holes 16' and the back-rest 15 is allowed to pivot about pivot pins 19 to fold over seat 23.

It must be noted that both the seat and the back-rest are rigid in whole, or they at least have a rigid base to effectively operate in this case, as if totally of rigid construction. For that purpose, the terms rigid base seat and rigid base back-rest are used to indicate that the invention is applicable also to a upholstered unit as long as there is a rigid base in it.

Figure 2:
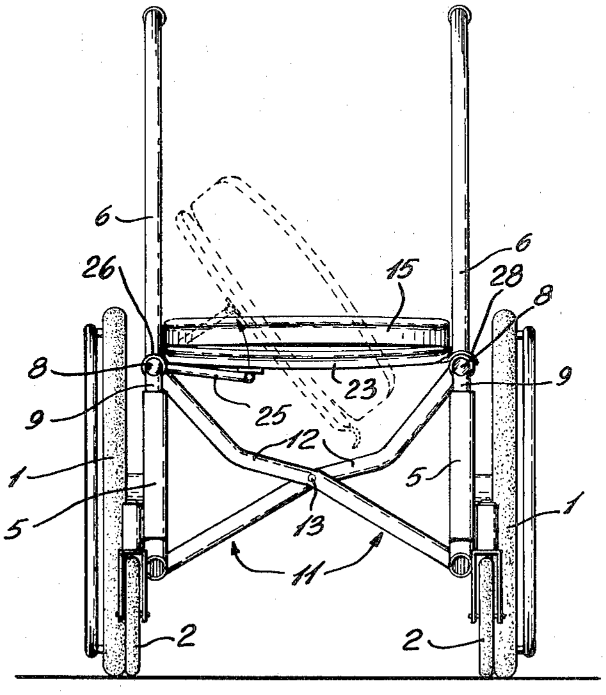
FIG. 2 is a front view of the same chair with the back-rest folded down over the seat.

A pair of offsetting arms 25 extend transversely of the wheel-chair and have an outer end secured to a sleeve 26 to pivot around the fore and aft bar 8 and have their inner end hinged against the bottom of the rigid base seat at 27. Thus, as seen in FIG. 2, the offsetting arms 25 are adapted to support the corresponding side of the seat.

A pair of seat-carrying supports 28 and 29, which could be made in a single piece, are secured longitudinally along the other side of the seat and are each provided with a cylindrically concave bottom portion to rest on the corresponding fore and aft bar 8 and, thus, support the corresponding side of the seat. The support 28 is provided with an axial projection 30. A locking sleeve 31 is slidably engaged around the corresponding fore and aft seat-carrying bar 8 to slide over the axial projection 30 and, thus, lock the seat against accidental tilting.

Figure 3:
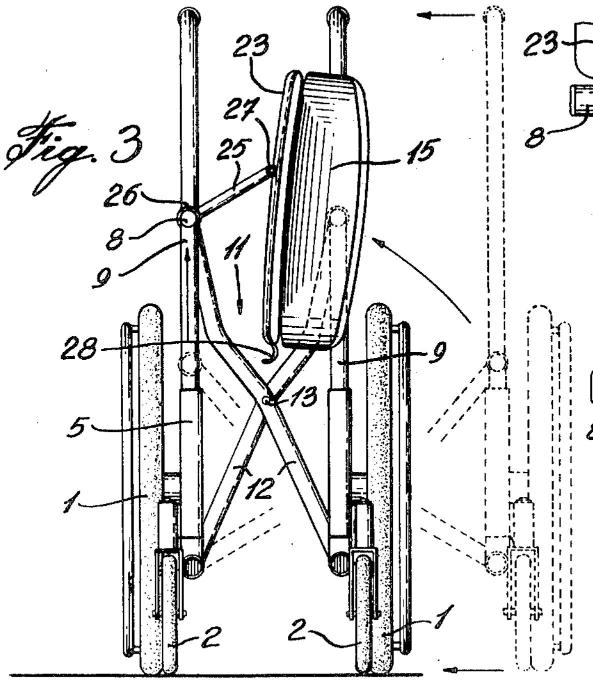
FIG. 3 is still a front elevation view but with the wheel-chair in partly-folded position.
Figure 7:
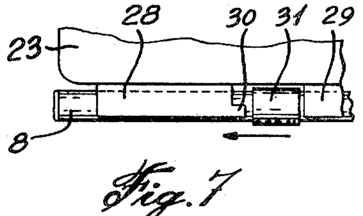
FIGS. 7 and 7*a* are a view of support and locking arrangement on one side of the rigid seat, in unlocked and locked position, respectively.
Figure 7A:
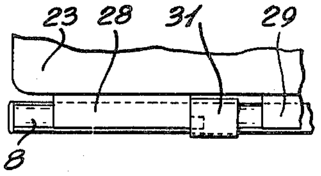

As shown in FIG. 3, the offsetting arms 25 allow to upwardly and laterally offset the seat and back-rest assembly relative to the corresponding side of the wheel-chair and such that the same assembly fits upwardly edgewise into the fore-mentioned interspace defined by the outward offset in the braces 12. FIG. 3 shows an intermediate position; the chair can be completely folded by further upwardly pivoting arms 25 to a vertical position. When folded, the wheel-chair does not take any more lateral room than a conventional foldable wheel-chair having flexible seat and back-rest.

Folding of the chair is accomplished as follows:

Sleeve 31 is unlocked and back-rest 15 is pulled up and folded over seat 23; seat 23 is slightly lifted to that supports 28, 29 clear adjacent bar 8; seat 23 is tilted downwardly about axis 27, as shown in dotted lines in FIG. 2, and pulled up to pivot arms 25 upwardly while handles 7 are brought together to fold the wheel-chair in the lateral direction.

What I claim is:

1. A folding wheel-chair operatively comprising a pair of opposite sides, an articulated bracing hinged to the opposite sides and folding therewith from an unfolded position to a folded position of the opposite sides with the latter, in their folded position, extending in laterally closer spaced-apart relationship, each of said opposite sides including a seat-carrying rod longitudinally extending in the fore and aft direction, a rigid base seat, at least one offsetting arm longitudinally extending laterally relative to said opposite sides and having an inner end pivotally connected to the rigid base seat under the same and intermediate its side edges, and an outer end pivotally connected to the seat-carrying rod of one of said opposite sides, with said one offsetting arm longitudinally extending laterally under the rigid base seat in supporting relationship therewith in the unfolded position of said opposite sides and upwardly and laterally offsetting the rigid base seat relative to said one side edge of said rigid base seat in the folded position of said opposite sides, a support device fixedly secured to said rigid base seat adjacent its other side edge and including a cylindrically concave bottom portion axially extending in the fore and aft direction for removably resting operatively onto the seat-carrying rod on the other of said opposite sides in the unfolded position of said opposite sides, and a rigid base back-rest hinged to the rigid base seat and operatively foldable from an erected operative position to a folded inoperative position over the rigid base seat.

2. A folding wheel-chair as defined in claim 1, wherein said cylindrically concave bottom portion includes a projection extending in the fore and aft direction and a locking sleeve is engaged around the seat-carrying rod on the other of said opposite sides and is selectively slidable fore and aft along the same rod for locking engagement over said projection, thereby locking the rigid base seat in operative position.

3. A folding wheel-chair as defined in claim 2, wherein each of said opposite sides includes a lower portion and an upper portion upwardly slidable relative one to the other, and said articulated bracing includes a pair of transversely-extending braces having an intermediate portion hinged one to the other about a fore and aft axis and having each an upper end portion hinged to a corresponding upper portion of said one and said other opposite sides and having each a lower end portion hinged to a corresponding lower portion of said one and said other opposite sides.

4. A folding wheel-chair as defined in claim 3 wherein said upper end portions of the braces are outwardly offset laterally away from each other and complementarily form a lateral interspace constructed and arranged to engage the rigid base seat upwardly edgewise therein.

5. A folding wheel-chair as defined in claim 1, further including at least one locking pin connection joining the rigid base back-rest to the rigid base seat.

6. A folding wheel-chair as defined in claim 1, wherein a pair of back-rest hinges include each a first hinge portion and a second hinge portion pivoted to the first hinge portion, the rigid base seat includes a pair of projections fixedly engaging in the fore and aft direction into the first hinge portions, respectively, and the rigid base back-rest includes a pair of projections slidably engaged in the second hinge portions, respectively, and in the first hinge portions, respectively, and are constructed and arranged to release the second hinge portions for pivoting thereof and the rigid base back-rest bodily therewith relative to the first hinge portions and to the rigid base seat, and means preventing removal of said last-named projections from within said second hinge portions.

7. A folding wheel-chair as claimed in claim 1, wherein the inner end of said one offsetting arm is pivotally connected under the rigid base seat and said one offsetting arm longitudinally extends laterally under the rigid base seat in supporting relationship therewith in the unfolded position of said opposite sides.

8. A folding wheel-chair operatively comprising a pair of opposite sides, an articulated bracing hinged to the opposite sides and folding therewith to a position with the opposite sides extending in laterally-closer spaced-apart relationship, a rigid base seat hingedly connected on one side relative to one of said opposite sides, a support device secured to the rigid base seat and removably supporting the latter on the other of said opposite sides, a rigid base back-rest, and a hinge connection hingedly connecting said rigid base back-rest to the rigid base seat for operatively folding said rigid base back-rest from an erected operative position to a folded inoperative position over the rigid base seat, said hinge connection including a pair of back-rest hinges, each including a first hinge portion and a second hinge portion pivoted to the first hinge portion, the rigid base seat including a pair of projections fixedly engaging in the fore and aft direction into the first hinge portions, respectively, and the rigid base back-rest including a pair of projections slidably engaged in the second hinge portions, respectively, and in the first hinge portions respectively in the operative position of said rigid base back-rest, upward pulling on said rigid base back-rest causing each last-named projections to clear the first hinge portions and release the second hinge portions for pivoting of the latter and of the rigid base back-rest bodily therewith relative to the first hinge portions and to the rigid base seat, and means preventing removal of the projections of said rigid base back-rest from within said second hinge portions.

* * * * *